United States Patent [19]

Pereira et al.

[11] Patent Number: 4,771,029
[45] Date of Patent: Sep. 13, 1988

[54] MONOLITH WASHCOAT HAVING OPTIMUM PORE STRUCTURE AND OPTIMUM METHOD OF DESIGNING THE WASHCOAT

[75] Inventors: Carmo J. Pereira; Joseph E. Kubsh, both of Silver Spring; Louis Hegedus, Rockville, all of Md.

[73] Assignee: W. R. Grace & Co.-Conn, New York, N.Y.

[21] Appl. No.: 52,103

[22] Filed: May 18, 1987

[51] Int. Cl.$^4$ .......................... B01J 21/04; B01J 32/00
[52] U.S. Cl. .................................... 502/355; 502/439; 423/213.5
[58] Field of Search ............................... 502/439, 355; 423/213.5

[56] References Cited

U.S. PATENT DOCUMENTS

| | | | |
|---|---|---|---|
| 3,907,512 | 9/1975 | Ziegenhain et al. | 23/293 A |
| 4,119,571 | 10/1978 | Hegedus et al. | 252/466 PT |
| 4,154,812 | 5/1979 | Sanchez et al. | 423/626 |
| 4,529,718 | 7/1985 | Dupin | 502/439 |
| 4,587,231 | 5/1986 | Sawamura et al. | 502/304 |
| 4,624,940 | 11/1986 | Wan et al. | 502/303 X |

FOREIGN PATENT DOCUMENTS 0119715  9/1984  European Pat. Off. .

OTHER PUBLICATIONS

Se H. Oh et al., "Design Aspects of Poison-Resistant Automobile Monolithic Catalysts", Ind. Eng. Chem. Prod. Res. Dev., vol. 22, No. 4, pp. 509-518, 1983.
L. L. Hegedus, Ind. Eng. Chem. Prod. Res. Dev., 19, 553, 1980.

*Primary Examiner*—W. J. Shine
*Attorney, Agent, or Firm*—Edward J. Cabic

[57] ABSTRACT

An optimum washcoated ceramic monolith for treating automotive exhaust gases is made by
(a) specifying the reactants, process conditions and desired time on stream;
(b) determining from the parameters in step (a) the pore size distribution and thickness of the washcoat to produce the desired auto exhaust conversion;
(c) preparing a washcoat catalyst with an alumina having the desired pore size distribution; and
(d) applying the prepared washcoat catalyst to a ceramic or metal monolith to produce a finished automotive exhaust gas catalyst. Following this process the optimized washcoated catalyst can then be used to treat automotive exhaust gases.

4 Claims, 2 Drawing Sheets

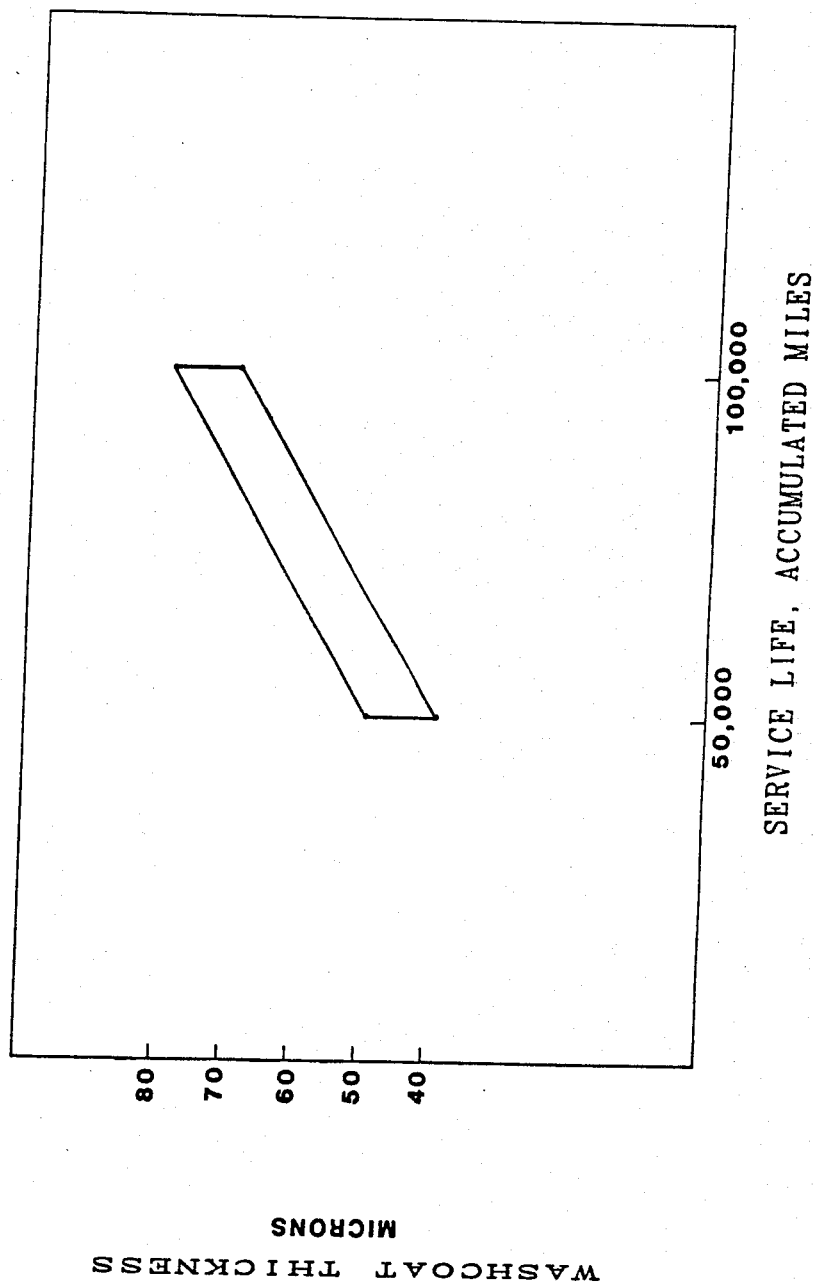

MONOLITH WASHCOAT HAVING OPTIMUM PORE STRUCTURE AND OPTIMUM METHOD OF DESIGNING THE WASHCOAT

BACKGROUND OF THE INVENTION

1. Field of the Invention

This invention relates to an analytical method to provide an optimum design for a monolith washcoat and to the resulting optimum pore structure of a washcoat for a monolith catalyst.

2. Description of the Previously Published Art

Oxidation and three-way emission control catalysts are well known in the prior art and among these are catalysts with specified physical characteristics. Ziezenlair et al in U.S. Pat. No. 3,907,512 disclose a pellet type oxidation catalyst having a pore volume greater than about 1.0 cm$^3$/g; a surface area greater than about 275 m$^2$/g and a macropore diameter of from 0 to 10,000 Angstrom units. Hegedus et al in U.S. Pat. No. 4,119,571 also disclose a pellet type oxidation catalyst which has a surface area of from 100 to 250 m$^2$/g; a pore structure characterized by a macropore volume of at least 0.020 cm$^3$/g and a macropore radius of greater than about 10,000 Angstrom units. Neither of these two pellet type catalyst inventions extend such pore structure characterizations to washcoats for monolith type emission control catalysts.

Dupin in U.S. Pat. No. 4,529,718 discloses a washcoat with both macroporosity and microporosity. The washcoat surface area is from 20 to 350 m$^2$/g with a macropore volume of at least 0.050 cm$^3$/g and a macropore radius greater than about 10,000 Angstrom units. Turner et al in EP No., 119,715 disclose a method for increasing the macroporosity of a washcoat by blending two refractory oxide supports with differing surface areas and pore size distributions. Oh et al in Ind. Eng. Chem. Prod. Res. Dev., 22 p. 509–518 (1983) provide a model for design aspects of poison-resistant automobile monolithic catalysts. Neither the Dupin or Turner inventions nor the Oh et al article, however, provide any algorithm for optimizing the washcoat's pore structure to maximize poison resistance of the catalyst or specify a required washcoat thickness to ensure sufficient catalytic performance over the required lifetime of the catalyst.

OBJECTS OF THE INVENTION

It is an object of this invention to provide an analytical method for the optimum design of a washcoat to be placed on a monolith to form a catalyst.

It is a further object of this invention to produce a washcoat for a monolith catalyst which has an optimum pore structure for automotive exhaust control.

It is a further object of this invention to optimize the pore structure of a washcoat to maximize the poison resistance of the catalyst.

It is a further object of this invention to provide the necessary washcoat thickness for a monolith catalyst to ensure sufficient catalytic performance over the required lifetime of the catalyst.

These and further objects will become apparent as the description of the invention proceeds.

SUMMARY OF THE INVENTION

The poisoning performance of automotive exhaust control monolithic catalysts depends on the properties of the ceramic or metal honeycomb (such as cell density, cell geometry, and aspect ratio), the stabilization package and active metals loadings used in the washcoat preparation, and on the pore properties and thickness of the washcoat in the final catalyst.

An analytical method for catalyst optimization is set forth which determines the best washcoat pore structure and thickness so as to provide optimum catalyst activity. Optimal converter geometry, and washcoat pore structure and thickness are determined depending on the pollutants and poisons in the exhaust gas and on the length of service required of the catalysts. Calculations indicate that significant improvement in reactant diffusion with reduced poison penetration into the washcoat are obtainable by use of washcoats having lower micropore volume and increased surface area over conventional substrates. Depending on the service life required of the catalyst and concentration of poisons in the exhaust gas, the model also recommends an appropriate washcoat thickness.

When making a washcoated monolith catalyst for treating automotive exhaust gases where the monolith is either ceramic or metal, the model predicts an optimum washcoat having a thickness in the range of 30–80 microns, a total pore volume in the range of 0.60–1.80 cm$^3$/g washcoat, a micropore volume in the range of 0.35–0.60 cm$^3$/g washcoat, a micropore radius below 60 Angstrom units and preferably above 30 Angstrom units, and a surface area between 125–250 m$^2$/g washcoat.

The present invention provides for a process to make an optimum washcoated ceramic monolith for treating automotive exhaust gases. The steps of the process involve (a) specifying the reactants and poisons so that the effective diffusion coefficient and mass transfer coefficients can be determined, process conditions such as the volumetric flow rate, the temperature, and concentration of poisons and desired time on stream in terms of desired catalyst life in hours;

(b) determining from the parameters in step (a) the optimum pore size distribution and thickness of the washcoat to produce the desired auto exhaust conversion by maximizing alpha in equation (9) infra where y in the equation is obtained from equations (4), (5) and (3) infra;

(c) preparing a washcoat catalyst with an alumina washcoat having the desired pore size distribution; and (d) applying the prepared washcoat catalyst to a ceramic or metal monolith to produce a finished automotive exhaust gas catalyst having the optimum washcoat as set forth above.

By using this process to make an optimized washcoated catalyst, one can then use that finished catalyst to treat automotive exhaust gases.

A desirable alumina powder having a lower micropore volume and higher surface area was selected in accordance with model results. The final catalyst's pore structure and thickness resulted in a higher activity under lean (i.e. excess oxygen) conditions as predicted by the model. Moreover the higher catalytic activity for this monolithic catalyst was evident across a broad range of operating conditions. A catalyst prepared as per model results also had superior poison resistance performance in our laboratory aging test as described in Example 4.

BRIEF DESCRIPTION OF THE DRAWINGS

The FIG. 1 is a schematic diagram of the optimization algorithm according to the present invention.

FIG. 2 represents the optimum washcoat thickness range for various levels of service miles.

DECRIPTION OF THE PREFERRED EMBODIMENTS

Figure 1:
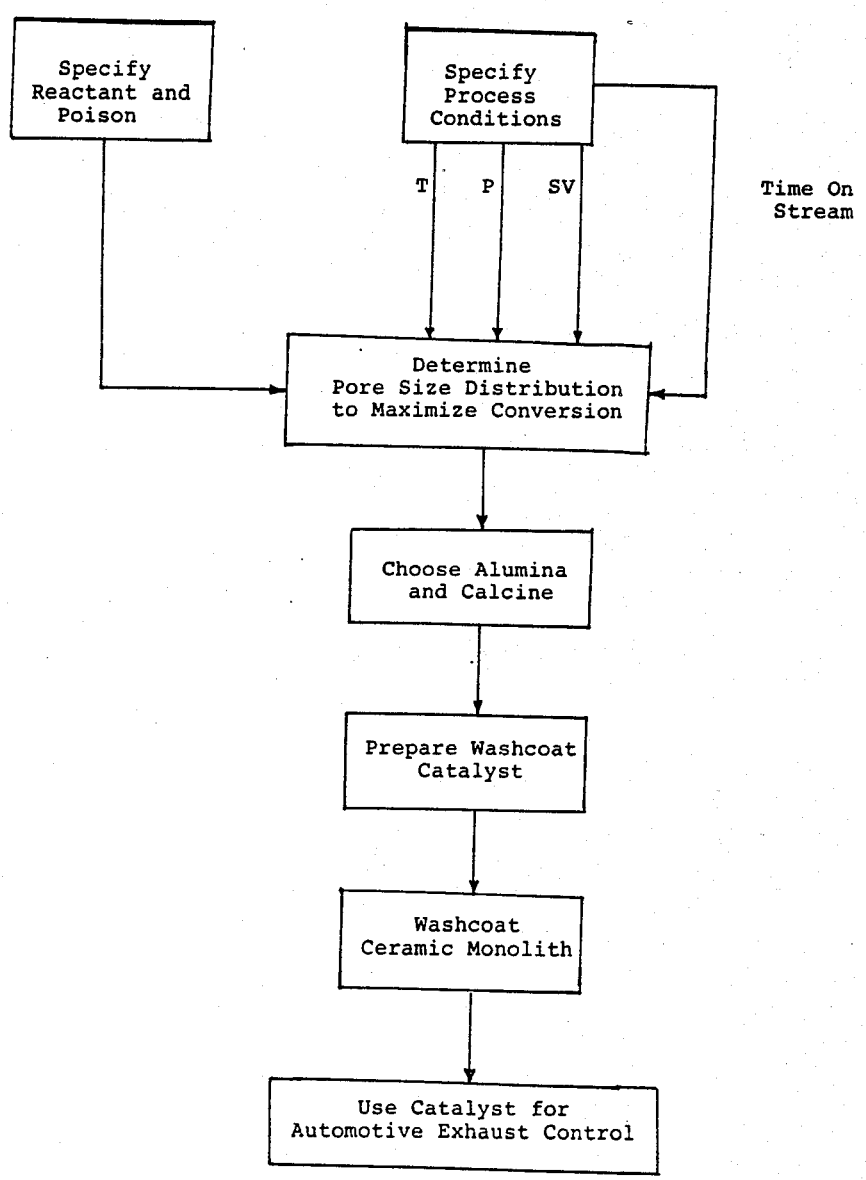

This invention relates to an analytical method to provide a monolith washcoat with physical characteristics (i.e. pore structure and thickness) that yield improved poison resistance. The resulting monolith washcoat pore structure and washcoat thickness yield higher catalytic performance over its required lifetime in the operating environment which includes precursor compounds such as phosphorus and lead that are known catalyst poisons.

More particularly, the washcoat catalysts of this invention are intended for use an emission control catalysts in vehicles. In this application the catalytically active washcoat is placed on the internal surfaces of a multi-channeled ceramic or metal body. Depending on the catalyst formulation the resulting coated monolith can be intended to serve either as an oxidation catalyst in which the unburned hydrocarbons and carbon monoxide are oxidized, or as a three-way catalyst in which the aforementioned oxidation and reduction of nitrogen oxides occurs simultaneously.

In order to establish a common understanding as to the results achieved by our invention and as to the parameters defining the optimized washcoat, the following information describes the testing techniques used.

Washcoat surface area is measured by the $N_2$ adsorption BET technique which is well known in the art.

The washcoat pore structure, pore radius and pore volume, is readily determined by the mercury penetration technique using pressures up to 60,000 psig, this being well known in the art as mercury porosimetry. In our investigations such pore structure characterizations were made using a Micromeritics 9200 Porosimeter. The output of the porosimeter is plotted as the cumulative volume of mercury penetration per gram of sample versus the porosimeter pressure, the latter being plotted in a logarithmic fashion.

In general, washcoated monolith type catalysts show three types of pores, namely washcoat micropores, washcoat macropores, and pores associated with the ceramic or metal monolith. The porosimeter curve will in general show three steps, one for each type of porosity. The inflection points in the porosimeter curve represent the breakpoint for each type of porosity. As the porosimeter curve proceeds from the lowest pressure to the highest, the successive steps are associated with first the monolith porosity, followed by the washcoat macroporosity, and then finally the washcoat microporosity.

The pore radius associated with each type of porosity can be calculated directly from the applied pressure. The cumulative pore volumes associated with each type of porosity in $cm^3/g$ can be read directly from the porosimeter curve. The pore radius and pore volume information is then used to calculate integral average pore radii for each type of porosity as detailed, for example, by J. M. Smith in "Chemical Engineering Kinetics" (McGraw Hill Publishing Co., New York, 2nd Edition, 1970). In some cases an overlap may exist between porosity associated with the ceramic or metal monolith and the washcoat macroporosity. In such cases the porosimeter curve of the washcoated monolith is compared to an uncoated monolith. An appropriate subtraction is then made between the weighted averages of the two curves to deconvolute this overlap.

The thickness of the washcoat is determined by the experimental measurement of the washcoat pick-up (on a dry basis) onto the ceramic or metal substrate as a result of the washcoating step and by assuming that the washcoat is uniformly deposited on all the surfaces of the internal channels. This information combined with the density of the washcoat and the available geometric area of the ceramic or metal monolith's channels allow for the calculation of an average washcoat thickness.

A schematic of the method employed in preparing catalysts of the present invention is shown in FIG. 1.

Firstly, using a reaction engineering model, the washcoat thickness and pore structure are optimized so as to maximize the diffusionally-limited reactant (e.g. pollutant) conversion after a specified period of operation (e.g. 1000 h of operation equivalent to 50,000 miles of road service). The optimization algorithm is similar to that described by L. L. Hegedus in Ind. Eng. Chem. Prod. Res. Dev., 19, 553, 1980, which is used for the optimization of the pore structure of bead auto exhaust catalysts. Hegedus' analysis cannot be used for determining the pore structure of the monolith washcoat because the washcoat thickness is in the range of 20–100 micrometers while the beads are typically 0.25 cm. in diameter or larger. Further, such beaded catalysts are known to move around in the converter during operation and such movement influences the reaction engineering model used in describing catalyst performance. As per the teachings of Hegedus, however, phosphorus is taken to be the primary poison and propylene is the primary reactant for which the diffusionally-limited conversion is calculated.

Secondly, an alumina having the micropore volume and micropore diameter as recommended by the algorithm is prepared. This step involves the precipitation of alumina as per the teachings of Sanchez et al in U.S. Pat. No. 4,154,812 and calcination of the resulting alumina powder as practiced in the art to form pores having the required average pore diameter.

The alumina is then impregnated with the necessary promoters and catalytically active metals and washcoated onto the ceramic or metal substrate. The pore structure and thickness of the final washcoat is measured and compared with that of the optimum properties predicted in the first step. The model is used to quantify the performance of the washcoated catalyst against that of a base case catalyst. As shown in Examples 3 and 4, we believe that washcoats having a higher calculated performance will show improved poison resistance.

DETERMINATION OF OPTIMAL PORE STRUCTURES

The pore structure of the washcoat, as discussed earlier, is characterized by macropore volume, ($V_{macro}$), micropore volume, ($V_{micro}$), integral-average macropore radius ($r_{macro}$) and integral-average micropore diameter ($r_{micro}$). The washcoat thickness is w. The washcoat thickness w for a coated monolith is determined by calculating the geometric surface area of the monolith and calculating the depth of the applied washcoated material if it were uniformly deposited over the entire surface area. The washcoat density, $rho_w$, is $$rho_w = 1/[(1/rho_s) + V_{macro} + V_{micro}] \qquad (1)$$

where $rho_s$ is the skeletal density of the washcoat material. The surface area of the washcoat, S, is $$S = 2[(V_{macro}/r_{macro}) + (V_{micro}/r_{micro})] \qquad (2)$$

The monolith catalyst is assumed cylindrical in shape, of length L and radius R. Non-cylindrical cross sections may be treated, as well, by calculating an equivalent radius based on the known cross sectional area of the monolith. The channels within the honeycomb are square in cross-section with sides of size b. The channels are separated by walls of thickness a. The average velocity in each channel is given as $$v = \frac{Q}{\pi R^2} \left( \frac{a+b}{b-2w} \right)^2 \qquad (3)$$

where Q is the volumetric flow rate of the inlet gas at reaction conditions. The phosphorus poison precursor present in the inlet gas diffuses to the surface of the catalyst and poisons the catalytically active sites. The mass conservation equation for the poison precursor is $$\frac{(v)(\delta C_{p,g})}{(\delta x)} + \frac{(\delta C_{p,g})}{(\delta t)} = -\frac{4 C_{p,g}}{(b-2w)\left[\frac{1}{k_{m,p}} + \frac{y}{D_{e,p}}\right]} \qquad (4)$$

where $C_{p,g}$ is the gas phase poison concentration at time t and position x, x is the axial distance down the monolith, t is the time of operation of the catalyst, $k_{m,p}$ is the mass transfer coefficient for the poison, $D_{e,p}$ is the effective diffusion coefficient of the poison into the washcoat layer and y is the thickness of the poisoned layer within the washcoat. The terms $k_{m,p}$ and $D_{e,p}$ are determined using standardly available literature correlations. The thickness of the poisoned layer y is determined from the solution of equation 5:

$$(C_{p,inf})\left(\frac{\delta y}{\delta t}\right) = \frac{C_{p,g}}{\left[\frac{1}{k_{m,p}} + \frac{y}{D_{e,p}}\right]} \qquad (5)$$

where $C_{p,inf}$ is the saturation concentration of the poison on the washcoat. The poison concentration at the inlet of the monolith catalyst, $C^\circ_{p,g}$, is assumed constant for the duration of catalyst life. The catalyst is assumed fresh at the beginning of the experiment (i.e. poison concentration on the washcoat is zero at time=0). Equations (4) and (5) are solved simultaneously and an axial poison penetration profile is calculated. The washcoat at the inlet of the monolith is completely poisoned at a dimensionless time $psi_o$ given by $$psi_o = \frac{(v)(w)(C_{p,inf})}{(L) C^\circ_{p,g}} \left[ \frac{w}{2D_{e,p}} + \frac{1}{k_{m,p}} \right] \qquad (6)$$

After time $psi_o$ a section of the washcoat at the inlet of the monolith becomes completely poisoned. This section extends from the inlet to a fractional axial distance s* into the monolith where $$s^* = \text{Beta}(psi_s - psi_o) \qquad (7)$$

where $$\text{Beta} = \frac{b-2w}{4w} \frac{(C^\circ_{p,g})}{(C_{p,inf})}$$

and $psi_s$ is the dimensionless time (v)(t)/L.

The reactant which is assumed to be propylene flows axially through the monolith channels and diffuses to the washcoat surface and through the poisoned layer and reacts in the active zone (i.e. unpoisoned region of the washcoat). The oxidation rate of propylene is known to be very fast and is assumed to be instantaneous under lean (i.e. excess oxygen) conditions. The reactant conversion at the exit of the reactor is $$\text{Conversion} = 1 - \exp[-\text{alpha}] \qquad (8)$$

where $$\text{alpha} = \frac{4\pi R^2 L}{Q(b-2w)} \left( \frac{b-2w}{a+b} \right)^2 \int_{s^*}^{1} \frac{ds}{\left[\frac{1}{k_{m,a}} + \frac{y}{D_{e,a}}\right]} \qquad (9)$$

where the subscript a refers to the reactant properties and s* is the fractional axial distance within the monolith that is completely poisoned determined from equation (7) above.

Knowledge of the properties of the ceramic or metal monolith (such as cell size and wall thickness), the washcoat thickness and pore-structure, the phosphorus and propylene concentration in the inlet gas and their transport properties (e.g., the mass transfer coefficient and the effective diffusion coefficient) allows us to calculate the value of alpha using equation (9). We believe that the value of alpha is an indication of the poison resistance of the catalyst. Catalysts having a larger positive alpha value will exhibit improved performance due to their improved poison resistance.

The model can also be used to predict the relative poison resistance of competing washcoat pore structures and thicknesses. The washcoat with the highest alpha value will have the greatest resistance to poisoning. The advantages of catalysts having washcoats of the present invention will be illustrated in Examples 2-4.

In the optimization routine, the washcoat thickness and pore structure are constrained to be within physically realistic values and optimized so as to maximize the objective function, alpha, for 1000 hours of operation. A sample of our optimization results is shown in Table 1. As can be seen in Table 1 our method can be used to optimize the washcoat thickness of a conventional washcoat alumina, or to optimize the pore structure and washcoat thickness of an unspecified alumina, or to perform the washcoat pore structure optimization and to optimize the cell design (e.g. cell density) of the ceramic or metal substrate.

TABLE 1
MONOLITH OPTIMIZATION RESULTS (a)

|  | Base Case | Base case with Optimized Washcoat Thickness | Optimized Pore Structure and Washcoat Thickness | Optimized Pore Structure Washcoat Thickness & Cell Design |
|---|---|---|---|---|
| $V_{micro}$ (cm$^3$/g) | 0.542 | 0.542 | 0.473 | 0.491 |
| $V_{macro}$ (cm$^3$/g) | 0.404 | 0.404 | 1.205 | 1.164 |
| $r_{micro}$ AU (b) | 100 | 100 | 50.0 | 50.0 |
| $r_{macro}$ AU | 2,500 | 2,500 | 10,000 | 9,571 |
| w (microns) | 20 | 38.4 | 47.3 | 53.3 |
| N (c) No. cells/cm$^2$ | 62 | 62 | 62 | 100 |
| L/R | 2.02 | 2.02 | 2.02 | 2.02 |
| S m$^2$/g | 111.5 | 111.5 | 191.0 | 198.8 |
| $rho_w$ (g/cm$^3$) | 0.813 | 0.813 | 0.510 | 0.516 |
| delta P (d) (torr) | 10.3 | 11.02 | 12.7 | 23.7 |
| alpha | 3.0 | 4.56 | 5.64 | 8.89 |

(a) Optimized for 1000 h of service
(b) AU = Angstrom Units
(c) 62 cells/cm$^2$ corresponds to a 400 cells/in$^2$ monolith
(d) pressure drop across the monolith As is seen from the alpha values in Table 1 substantial improvements over the base case are possible via pore structure optimization. In each case, an optimal washcoat thickness and pore structure is identified. We believe that within the constraints set forth by us in the model that the pore structures reported in Table 1 are the optimal.

In general, the model discloses that the washcoated monolith catalyst for treating automotive exhaust gases where the monolith is either ceramic or metal should have a washcoat having a thickness in the range of 30–80 microns,
a total pore volume in the range of 0.60–1.80 cm$^3$/g washcoat,
a micropore volume in the range of 0.35–0.60 cm$^3$/g washcoat,
a micropore radius below 60 Angstrom units and preferably above 30 Angstrom units, and
a surface area between 125–250 m$^2$/g washcoat.

The mathematical analysis discussed is general and can easily accomodate changes in feed concentration and the lifetime requirements of the catalyst. Each new scenario will result in an unique and physically significant optimal washcoat thickness and pore structure.

A further feature of the invention is the ability to first select a particular alumina and specify a desired performance life of the catalyst in terms of poison resistance and then by using the mathematical relationships according to the present invention determine the minimum, optimum thickness of the washcoat needed. This ability is economically important because one can avoid having excess amounts of washcoat on the walls of the monolith which would increase the cost of manufacture.

For example, one can first select an alumina washcoat powder (e.g. alumina made according to the teachings of Sanchez et al in U.S. Pat. No. 4,154,812) which has a micropore volume of 0.542 cm$^3$/g and a micropore radius of 100 Angstroms. Then one selects a useful life of 50,000 miles (i.e., 1000 h of operation). Using the formulas detailed previously, the optimum thickness of 38 microns is obtained for this washcoat alumina as well as the specification of the macropore volume of 0.404 cm$^3$/g and macropore radius of 9800 Angstroms. Using analogous calculations, the following optimum monolith catalyst formulations are obtained as set forth in Table 2 below. The optimal thicknesses set forth in Table 2 were calculated for the converter conditions detailed in Table 2.

TABLE 2
OPTIMUM THICKNESS FOR ALUMINA WITH $V_{MICRO}$ OF 0.542 cm$^3$/g

|  | Catalyst Life (accumulated miles) | |
|---|---|---|
|  | 50,000 | 100,000 |
| Optimal Washcoat Thickness, microns | 38 | 62 |
| Washcoat macropore volume, $r_{macro}$, cm$^3$/g | 0.404 | 0.404 |
| Washcoat macropore radius, $r_{macro}$, Angstroms | 9800 | 9800 |

| Converter conditions used for above thickness optimizations | |
|---|---|
| Inlet temperature ($T_{in}$) | 500° C. |
| Inlet pressure ($P_{in}$) | 760 torr |
| Inlet poison (i.e. phosphorus) concentration, ($C.°_{p, g}$) | $4 \times 10^{-13}$ molecules/cm$^3$ |
| Exhaust flow rate at $T_{in}$, $P_{in}$ (Q) | 100,000 cm$^3$/g |
| Monolith volume ($\pi R^2 L$) | 1147 cm$^3$/g |
| Monolith wall thickness (a) | 0.007 in. |
| Monolith channel opening (b) | 0.043 in. |

PREPARATION OF THE ALUMINA

Methods for preparing alumina powders are well known in the art. For example, U.S. Pat. No. 4,154,812 describes a process for the preparation of alumina powder. Changes in precipitation conditions result in a modification of the pore properties of the alumina powder. Lowering the pH conditions and/or temperature of the precipitation process will typically reduce micropore volume and the average crystallite size of the resulting alumina.

The micropore diameter of the powder may also be modified by calcining the alumina. As is well known in the art, higher calcination temperatures lead to larger micropores. The present invention suggests that higher surface area supports having micropore diameters of greater than 100 Angstrom units with good hydrothermal and sintering stability are preferred. A lower bound of 50 Angstrom units for the micropore radius is chosen as a constraint so as to ensure catalyst surface area stability.

As is discussed below, the support is further stabilized by the addition of promoters and stabilizers that may also influence final catalyst pore structure.

Having described the basic aspects of our invention, the following examples are given to illustrate specific embodiments thereof.

EXAMPLE 1

This example discusses the properties of a standard alumina powder and of an alumina powder having a lower micropore volume and lower micropore diameter of the present invention. Powder properties are shown in Table 3.

TABLE 3

Pore Structures of Base Aluminas Used for Washcoat Formulations after Calcination in Air at 538° C.

|  | Present Invention Powder A | Standard Base Powder B |
|---|---|---|
| Surface Area, m²/g | 327 | 308 |
| Total Pore Volume, cm³/g | 0.561 | 0.800 |
| $V_{micro}$, cm³/g | 0.561 | 0.800 |
| $r_{micro}$, Angstrom units | 41 | 90 |
| $V_{macro}$, cm³/g | 0 | 0 |
| $d_{macro}$, Angstrom units | — | — |

EXAMPLE 2

This example describes the preparation of catalysts having differing catalytic metals loadings using the alumina powder of the present invention.

Alumina powders from the prior example were impregnated with rare earth solutions to incipient wetness. Catalysts A and B were prepared from powders A and B respectively and contained 6 wt% ceria. Catalysts C and D utilized powders A and B respectively and contained 3 wt% ceria and 4 wt% lanthana. In addition, catalysts C and D contained 9 wt% NiO which was applied by incipient wetness impregnation of a nickel nitrate solution.

Catalysts A and B were prepared as practiced in the art to yield a total noble metal loading of 23 g of noble metal per cubic foot of finished catalyst with a Pt to Rh ratio of 7:1 by weight. Similarly, catalysts C and D were prepared to yield a noble metal content of 50 g per cubic foot of finished catalyst with a Pt to Rh ratio of 5:1 by weight. In all cases the washcoat was coated onto ceramic (i.e. cordierite) monoliths with the following physical characteristics: 400 channels/in², and 0.007 in. wall thickness (i.e. a=0.007 in., b=0.043 in. in our model calculations).

The alumina powder containing the desired stabilizer, promoter and noble metal ingredients is wet-milled for sufficient time to achieve an average particle size of less than 10 microns. The viscosity of the resulting slip may be adjusted to approximately 200-1000 centipoise by an appropriate adjustment to the slip pH. Ceramic monoliths are then dipped one or more times into the slip with intermediate drying between coatings to obtain the desired washcoat loading. The final monolithic catalyst is activated in hydrogen at 400° C. for 2 hours.

Catalyst pore properties for the finished monolithic catalysts are shown in Table 4. Washcoat pore properties were determined by the porosimetric techniques described earlier. Catalysts B and D have pore structures and washcoat thickness of the base catalyst and catalysts A and C have pore structure and washcoat thickness of the present invention. The catalysts of the present invention have a higher washcoat density, a lower micropore volume and a higher surface area than the base case catalyst. The pore properties of catalyst A and B are not identical with the optimal washcoat pore properties recommended in Table 1, column 3. However as will be shown in Example 3, the alpha value calculated for catalysts A and C is significantly higher than that calculated for the base case catalysts, B and D.

TABLE 4

Physical Properties of Monolith Test Samples (a)

|  | Base Washcoat B & D | Present Invention Washcoat A & C |
|---|---|---|
| Monolith composition | Cordierite | Cordierite |
| Washcoat thickness (microns) | 38-43 | 34 |
| Washcoat pore volume (cm³/g washcoat) | 1.150 | 0.688 |
| $V_{macro}$ (cm³/g washcoat) | 0.566 | 0.296 |
| $V_{micro}$ (cm³/g washcoat) | 0.584 | 0.392 |
| $r_{macro}$ (Angstroms) | 2500 | 4000 |
| $r_{micro}$ (Angstroms) | 91 | 52 |
| Washcoat surface area (m²/g washcoat) | 128 | 150 |
| Washcoat density (g washcoat/cm³) | 0.696 | 1.027 |

(a) Washcoat pore properties based on Hg porosimetry data for coated and uncoated monoliths.

EXAMPLE 3

This example illustrates the effectiveness of the mathematical analysis in predicting the poisoning resistance of the catalyst of the present invention.

The pore properties for catalysts A, B, C and D were inputed into the mathematical algorithm of the present invention along with the physical properties of the ceramic monolith to determine the relative performance of each after 1000 hours of operation in the presence of a phosphorous poison. Converter operating conditions were chosen to be the same used in the washcoat thickness calculations described in Table 2. Results are summarized in Table 5.

TABLE 5

Activity of Catalysts After 1000 Hours of Operation

|  | relative alpha-value |
|---|---|
| Catalyst A and C | 1.38 |
| Catalyst B and D | 1.00 |

As is seen from Table 5, the mathematical algorithm predicts that the catalysts of the present invention will have a significantly higher oxidation activity under lean conditions after 1000 hours of operation.

EXAMPLE 4

This example discusses the laboratory testing of catalyst poisoning resistance.

A 12.4 cc sample each of the catalysts made in Example 2 was subjected to accelerated aging on a pair of pulse flame combustors or "pulsators" for periods of 90 and 270 hours, at approximately 60 pulses/minute using n-hexane containing 0.132 g/liter Pb, 0.05 g/liter P, and 0.08 wt% S. The apparatus for this procedure is described by M. V. Ernest and G. Kim in Soc. Automot. Eng. Paper No. 800083. During the period of aging the catalyst samples were allowed to experience cycling temperatures. The cycle consisted of a lower temperature of 566° C. which was maintained for 75 minutes and then a higher temperature of 732° C. which was maintained for 15 minutes.

Each catalyst sample was then evaluated by the "Perturbed Sweep Test" procedure described in Ind. Eng. Chem. Prod. Res. Dev., 21, 267 (1982), using the simulated exhaust gas feed shown in Table 6.

TABLE 6

Simulated Auto Exhaust Gas Mixture for the "Perturbed Sweep Test"

| Gas | Vol % |
|---|---|
| $HC^a$ | 0.0400 |
| CO | 0.295–0.80 |
| $H_2$ | 0.098–0.267 |
| NO | 0.185 |
| $SO_2$ | 0.0020 |
| $O_2$ | 0.245–0.725 |
| $CO_2$ | 14.5 |
| $H_2O$ | 10.0 |
| $N_2$ | balance |

$^a$A mixture of $C_3H_6$ and $C_3H_8$ at a molar ratio of $C_3H_6/C_3H_8 = 4/1$.

The average reducing or oxidizing conditions of the feed mixture is represented by the ratio R given below:

$$R = \frac{[O_2] + 0.5[NO]}{\frac{2}{3}[CO] + 5[CH_3H_8] + 4.5[C_3H_6]}$$

wherein $[O_2]$, $[NO]$, $[CO]$, $[C_3H_8]$, $[C_3H_6]$ are the molar concentrations in the feed gas. The conversions of HC, CO and NO are determined as a function of the ratio R. A constant inlet temperature of 482° C. is maintained throughout the test with a GHSV of approximately 40,000.

The results presented in Table 7 represent catalyst performance under a lean (R=1.5), stoichiometric (R=1.0), and a rich (R=0.7) operating condition. Performance in Table 7 is reported as % conversion for each of the three pollutants (hydrocarbons, carbon monoxide, and nitrogen oxides).

TABLE 7

Activity Comparisons (Fresh vs. Aged) for Monolith Catalysts

| Catalyst | Condition | Noble Metal Loading, g/ft³ | Pt/Rh Ratio | R = 1.5 | | | R = 1.0 | | | R = 0.7 | | |
|---|---|---|---|---|---|---|---|---|---|---|---|---|
| | | | | HC | CO | NO | HC | CO | NO | HC | CO | NO |
| B | Fresh | 23 | 7:1 | 80 | 91 | 55 | 80 | 70 | 88 | 53 | 31 | 88 |
| A | Fresh | 23 | 7:1 | 80 | 88 | 56 | 70 | 67 | 85 | 39 | 33 | 84 |
| B | Pulsator-Aged 270 h | 23 | 7:1 | 61 | 84 | 46 | 50 | 70 | 70 | 6 | 40 | 54 |
| A | Pulsator-Aged 270 h | 23 | 7:1 | 70 | 91 | 39 | 49 | 83 | 73 | 6 | 54 | 69 |
| D | Fresh | 50 | 5:1 | 97 | 96 | 57 | 96 | 85 | 92 | 94 | 74 | 94 |
| C | Fresh | 50 | 5:1 | 94 | 94 | 56 | 93 | 84 | 90 | 91 | 68 | 92 |
| D | Pulsator-Aged 90 h | 50 | 5:1 | 81 | 87 | 46 | 78 | 64 | 65 | 74 | 51 | 75 |
| C | Pulsator-Aged 90 h | 50 | 5:1 | 90 | 93 | 53 | 88 | 74 | 77 | 83 | 58 | 83 |

Table 7 shows that in each case, the catalysts of the present invention (Catalyst A and C) had higher oxidation activity under lean operation (data for R=1.5 in Table 7) after the poisoning experiment as predicted by the model in Example 3. Furthermore, performance with respect to hydrocarbons (HC), carbon monoxide (CO) and nitrogen oxides (NO) for the catalysts of the present invention is comparable with or superior to that of the base catalysts across the entire stoichiometric range at the conclusion of the pulsator aging. It is important to note that the model can be used to predict monolithic washcoat performance in the presence of poisons independent of the catalyst's promoter/stabilizer composition or its noble metal content. The examples cited above have compared a catalyst of the present invention with that base case catalyst formulation of similar composition for two differing overall compositions. Comparisons between catalysts of widely differing compositions or noble metal content, however, can not be made using our model.

It is understood that the foregoing detailed description is given merely by way of illustration and that many variations may be made therein without departing from the spirit of this invention.

What is claimed is:

1. An optimum washcoated monolith catalyst for treating automotive exhaust gases where the monolith is either ceramic or metal comprising a washcoat having
   a thickness in the range of 30–80 microns,
   a total pore volume in the range of 0.60–1.80 cm³/g washcoat,
   a micropore volume in the range of 0.35–0.60 cm³/g washcoat,
   a micropore radius below 60 Angstrom units, and
   a surface area between 125–250 m²/g washcoat.

2. A washcoated monolith catalyst according to claim 1 wherein the micropore radius is above 30 Angstrom units.

3. A washcoated monolith catalyst according to claim 1, having optimum thickness between lines A and B in FIG. 2 depending on the desired service length of the converter where lines A and B are based on the following data points

| Service Length (accumulated miles) | Optimal Washcoat Thickness (microns) |
|---|---|
| 50,000 | 40–50 |
| 100,000 | 70–80 |

4. Process for making a washcoated ceramic or metal monolith for treating automotive exhaust gases comprising the steps:
   (a) specifying
      (i) the reactant of CO, HC and $NO_x$ and poisons so that the effective diffusion coefficient and mass transfer coefficients can be determined,
      (ii) the process conditions including the volumetric flow rate, the temperature, and concentration of poisons, and
      (iii) desired time on stream in terms of desired catalyst life in hours;
   (b) determining from the parameters in step (a) the optimum pore size distribution and thickness of the washcoat to maximize alpha in the equation $$\text{alpha} = \frac{4\pi R^2 L}{Q(b-2w)} \left(\frac{b-2w}{a+b}\right)^2 \int_{s^*}^{1} \frac{ds}{\left[\frac{1}{k_{m,a}} + \frac{y}{D_{e,a}}\right]^5} \quad (9)$$

where y is obtained from the following equations $$\frac{(v)(\delta C_{p,g})}{(\delta x)} + \frac{(\delta C_{p,g})}{(\delta t)} = -\frac{4 C_{p,g}}{(b-2w)\left[\frac{1}{k_{m,p}} + \frac{y}{D_{e,p}}\right]} \quad (4)$$

and $$(C_{p,inf.})\frac{\delta y}{\delta t} = \frac{C_{p,g}}{\left[\frac{1}{k_{m,p}} + \frac{y}{D_{e,p}}\right]} \quad (5)$$

and where $$v = \frac{Q}{(\pi)R^2}\left(\frac{a+b}{B-2w}\right)^2 \quad (3)$$

where
$C_{p,g}$ is the gas phase poison concentration,
x is the axial distance down the monolith,
t is the time of operation of the catalyst,
$k_{m,p}$ is the mass transfer coefficient for the poison,
$D_{e,p}$ is the effective diffusion coefficient of the poison into the washcoat layer,
y is the thickness of the poisoned layer within the washcoat,
b is the size of the cross-section of the square honeycomb,
w is the washcoat thickness,
$C_{p,inf.}$ is the saturation concentration of the poison on the support,
Q is the volumetric flow rate of the inlet gas at reaction conditions,
R is the radius of the monolith catalyst, and
a is the thickness of the walls separating the channels;

(c) preparing a washcoat catalyst with an alumina washcoat having the desired pore size distribution; and (d) applying the prepared alumina washcoat catalyst to the ceramic or metal monolith to produce a finished automotive exhaust gas catalyst where the washcoat on the catalyst has
a thickness in the range of 30–80 microns,
a total pore volume in the range of 0.60–1.80 cm$^3$/g washcoat,
a micropore volume in the range of 0.35–0.60 cm$^3$/g washcoat,
a micropore radius below 60 Angstrom units, and
a surface area between 125–250 m$^2$/g washcoat.

* * * * *